United States Patent
Yen

(10) Patent No.: US 11,284,256 B2
(45) Date of Patent: Mar. 22, 2022

(54) METHOD AND SYSTEM FOR AUTOMATIC ACCESS TO WI-FI NETWORK

(71) Applicant: NANNING FUGUI PRECISION INDUSTRIAL CO., LTD., Nanning (CN)

(72) Inventor: Shih-Jung Yen, New Taipei (TW)

(73) Assignee: NANNING FUGUI PRECISION INDUSTRIAL CO., LTD., Nanning (CN)

(*) Notice: Subject to any disclaimer, the term of this patent is extended or adjusted under 35 U.S.C. 154(b) by 550 days.

(21) Appl. No.: 16/363,729

(22) Filed: Mar. 25, 2019

(65) Prior Publication Data

US 2020/0314649 A1    Oct. 1, 2020

(51) Int. Cl.
*G06F 7/04* (2006.01)
*H04W 12/06* (2021.01)
*H04W 12/08* (2021.01)
*G10L 25/51* (2013.01)

(52) U.S. Cl.
CPC .......... *H04W 12/068* (2021.01); *G10L 25/51* (2013.01); *H04W 12/08* (2013.01)

(58) Field of Classification Search
CPC ...... H04W 12/068; H04W 12/08; G10L 25/51
USPC .......................................................... 726/26
See application file for complete search history.

(56) References Cited

U.S. PATENT DOCUMENTS

| | | | |
|---|---|---|---|
| 9,082,413 B2* | 7/2015 | Herring | G06Q 20/3272 |
| 9,426,606 B2* | 8/2016 | Lee | H04W 76/14 |
| 2012/0239916 A1* | 9/2012 | Malasani | H04W 12/50 713/1 |
| 2014/0240762 A1* | 8/2014 | Shiraga | G06F 3/1247 358/1.15 |
| 2014/0283136 A1* | 9/2014 | Dougherty | G06F 21/6218 726/29 |

OTHER PUBLICATIONS

Dmitry Namiot; Geofence and Network Proximity; Springer:2013; pp. 1-6.*

* cited by examiner

*Primary Examiner* — Monjur Rahim
(74) *Attorney, Agent, or Firm* — ScienBiziP, P.C.

(57) ABSTRACT

A method for automatically allowing access to a WI-FI network by a mobile device can be applied to a mobile device and a WI-FI access point (AP). The mobile device includes a first microphone, first wireless communicating unit, and first processing unit. The first microphone obtains ambient sound, and the first wireless communicating unit can transmit accessing request. The mobile device can receive a password-generating command from a found WI-FI AP. The WI-FI AP comprises second microphone, second wireless communicating unit, and second processing unit. The second microphone also obtains ambient sound. The second wireless communicating unit receives the accessing request and transmits the password-generating command. The second processing unit generates an AP password according to the ambient sound and can compare a device password received from the mobile device. The mobile device is allowed to access the WI-FI AP when the device password matches with the AP password.

8 Claims, 7 Drawing Sheets

METHOD AND SYSTEM FOR AUTOMATIC ACCESS TO WI-FI NETWORK

FIELD

The subject matter herein generally relates to wireless security.

BACKGROUND

To establish a connection between a WI-FI access point (AP) and a mobile device, a name and password must be given to the AP. Users need turn on the WI-FI function of their mobile device and scan for the local AP. To create the connection between mobile device and the AP, users need to choose the AP and key-in name and password. The process of connection can be more convenient for the user.

Free WI-FI can be found in the bus stations, the restaurants, the convenience stores, etc. The user device can record the password after connecting to the AP. The mobile device can be connected to the AP automatically when the mobile device again enters the coverage of the wireless signal. However, wireless signal quality may be low when there are many devices connected to the AP, the Administrator of the AP may change the password frequently in such situations, to improve the signal quality and avoid non-customers using the AP. Such a system is inconvenient in management and in use.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
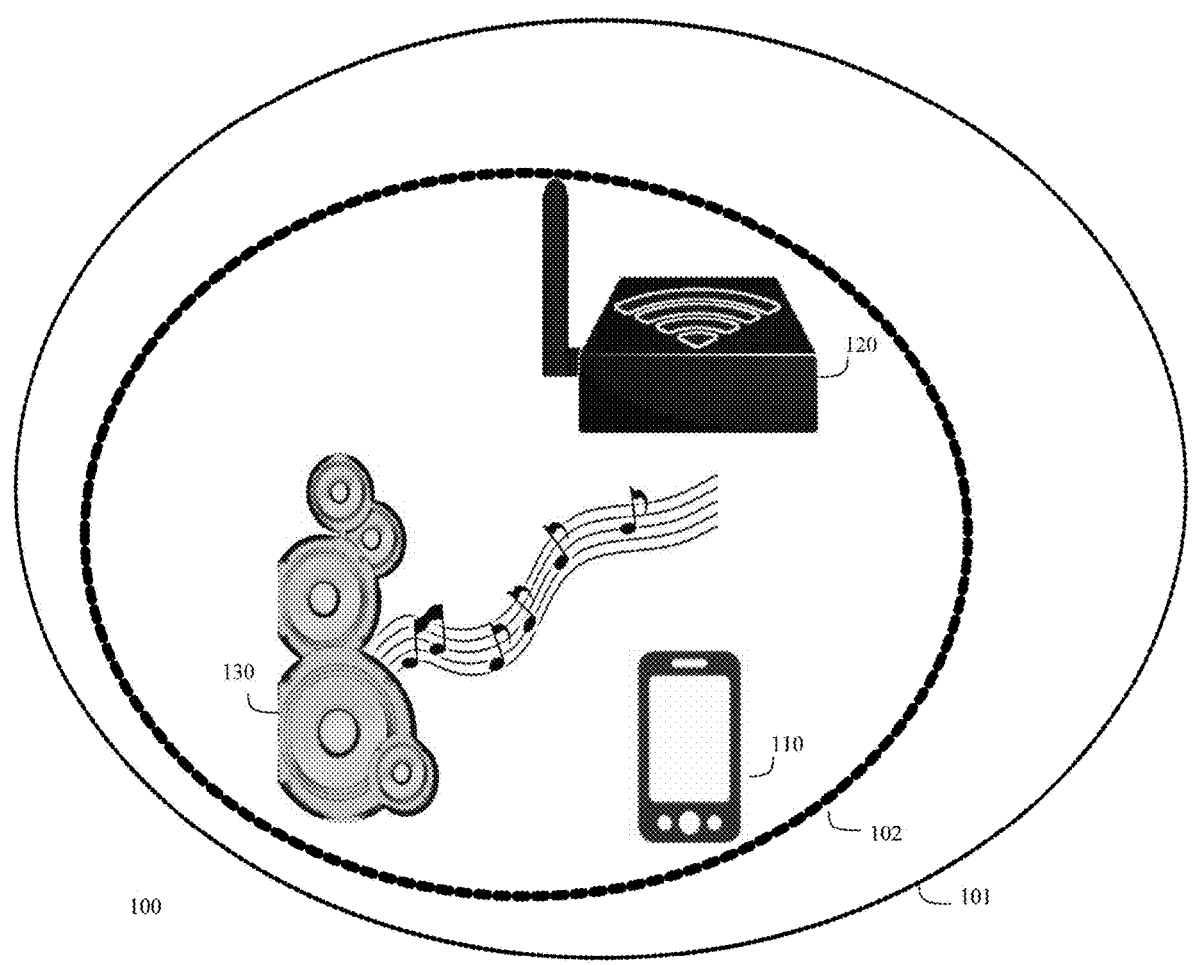
FIG. 1 illustrates a method for automatic access to WI-FI network according to an embodiment of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one".

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a method for automatic access to WI-FI network according to an embodiment of the disclosure. As shown in FIG. 1, the method and system of WI-FI network 100 comprises a mobile device 110 and a WI-FI access point (AP) 120. The ambient noise around a WI-FI AP 120 (traffic noise for example, or the sound of people in a mall) is ambience sound information 130. The ambience sound information 130 is recorded by a first microphone 121 of the WI-FI AP 120 and the second microphone 111 of the mobile device 110. Wireless signal 101 of the WI-FI AP 120 has bigger coverage than that of the audible range of ambience sound information 130. Therefore, being located within such audible range means that the mobile device 110 and the location of the WI-FI AP 120 are in the same environment and close together. The mobile device 110 and the WI-FI AP 120 receive the same ambience sound information 130, which is unique to that locality. The ambience sound information 130 is converted into a password as an authentication of the mobile device 110 which is requesting a connection to the WI-FI AP 120.

Figure 2:
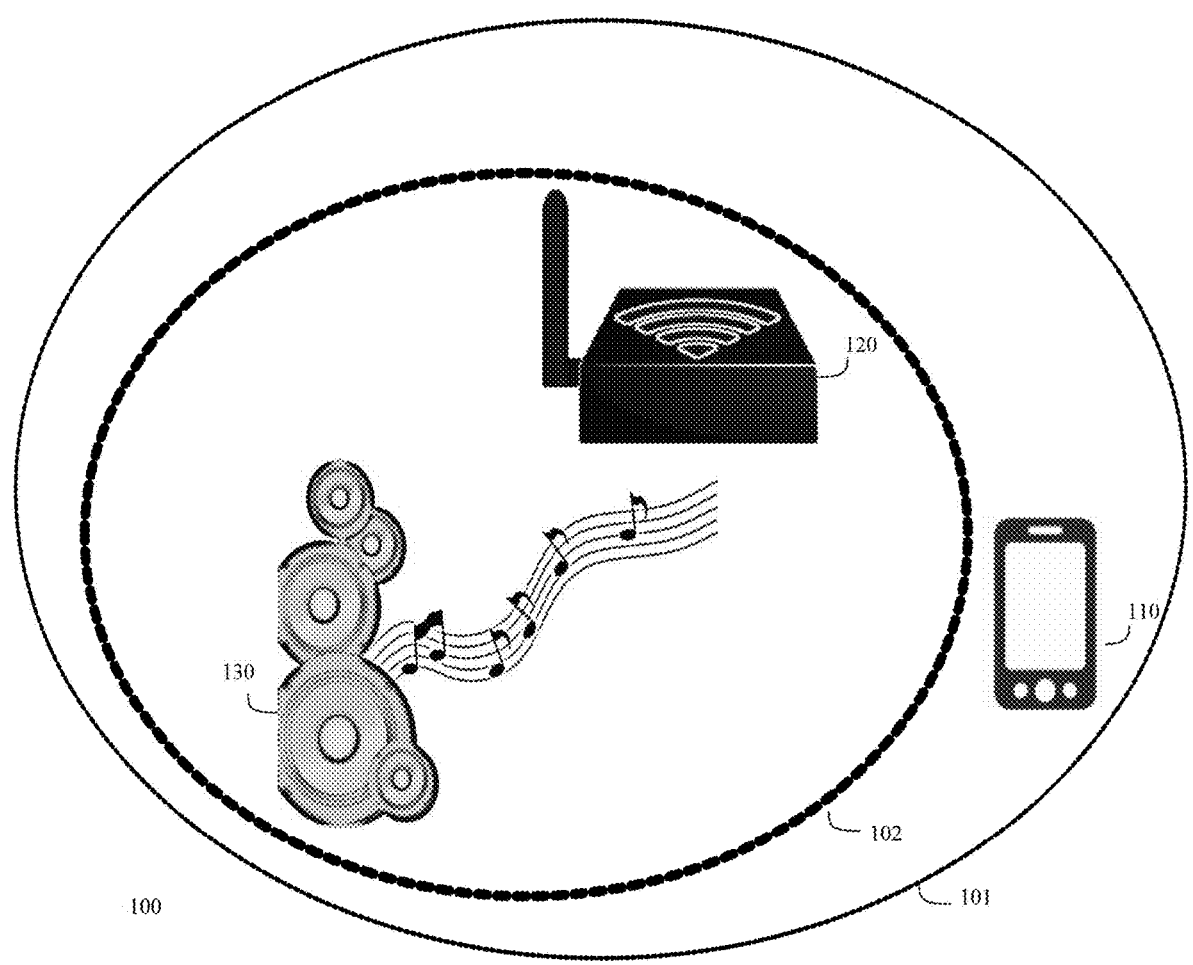
FIG. 2 illustrates a method for automatic access to WI-FI network in another embodiment of the disclosure.

FIG. 2 illustrates a method for automatic access to WI-FI network in another embodiment of the disclosure. As shown in FIG. 2, the mobile device 110 is within the coverage of the wireless signal 101 of the WI-FI AP 120, but the mobile device 110 is outside of the coverage of the ambience sound 102. The ambience sound information 130 being received by the WI-FI AP 120 is not the same as the ambience sound information 130 being received by the mobile device 110, therefore any password generated by one of them will not be the same as a password generated by the other of them, and wireless access will be refused. This manner of authorization limits wireless connections to a WI-FI AP 120. The WI-FI AP 120 can regularly check the ambient sound being received by the mobile device 110, to confirm the presence or absence of the mobile device 102 in the locality. The WI-FI AP 120 cannot grant the access request of the mobile device 102 if the mobile device 102 cannot obtain the password generated from the same ambience sound information 130. This restriction on access controls the wireless network resources effectively, and reserves the resources of the wireless network to the local users.

Figure 3:
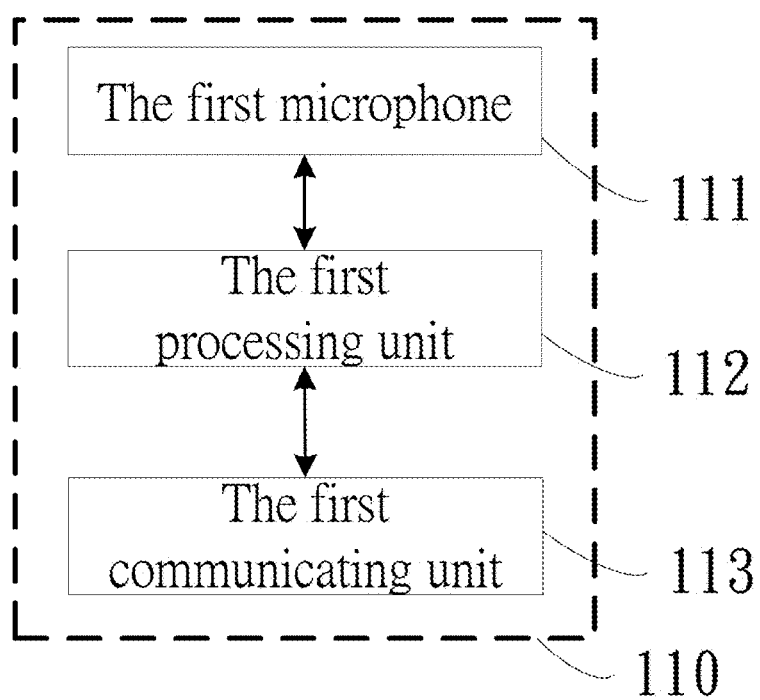
FIG. 3 illustrates a method for automatic access to WI-FI network in block form, according to an embodiment of the disclosure.

FIG. 3 illustrates a method for automatic access to WI-FI network in block form, according to an embodiment of the disclosure. As shown in FIG. 3, the mobile device 110 comprises a first microphone 111, a first processing unit 112, and a first communicating unit 113. The first microphone 111 constantly obtains ambience sound information 130 and can deliver the same to the first processing unit 112. The first processing unit 112 can generate a first password according to a password-generating command received from the WI-FI AP 120. The password-generating command includes start time and sampling frequency. When commanded, the processing unit 112 generates the first password.

An accessing request is first transmitted to the WI-FI AP 120 by the first communicating unit 113 of the mobile device 110. The password-generating command is transmitted to the first communication unit 113 of the mobile device 110 after the WI-FI AP 120 receives the accessing request from the device 110. The first password which is generated by the first processing unit 112 can be transmitted to the WI-FI AP 120 by the first communicating unit 113 of the mobile device 110.

Figure 4:
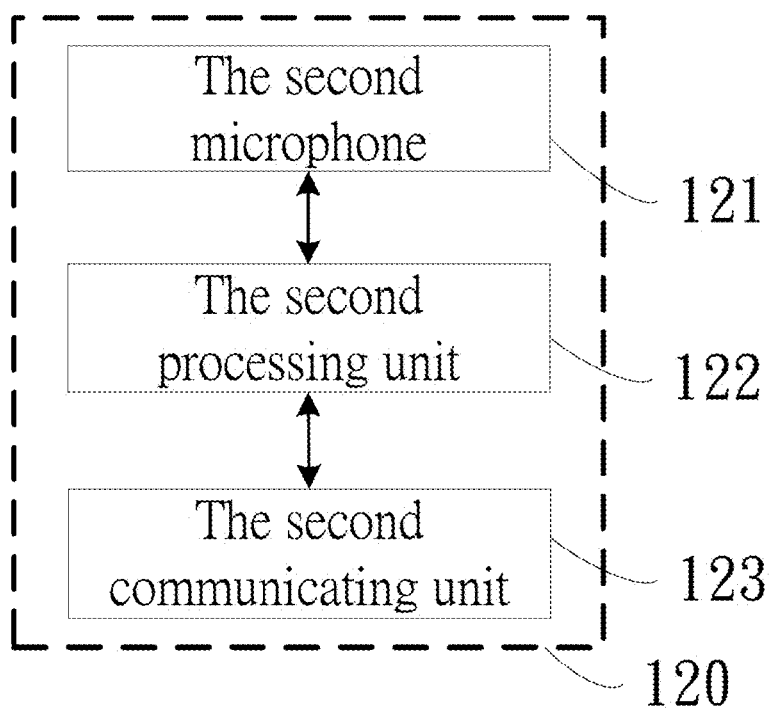
FIG. 4 illustrates a block diagram of the WI-FI access point in a method for automatic access.

FIG. 4 illustrates a function block of the WI-FI access point of a method for automatic access to WI-FI network according to an embodiment of the disclosure. As shown in FIG. 4, the WI-FI AP 120 comprises a second microphone 121, a second processing unit 122, and a second communicating unit 123. The second microphone 121 obtains ambience sound information 130 and passes same to the processing unit 122, for the generation of a second password. The WI-FI AP receives accessing request from device 110 through the second communicating unit 123. The second communicating unit 123 will also receive the first password which is generated by the mobile device 110. The second processing unit 122 obtains the accessing request and the first password from the device 110 through the second communicating unit 123. The second processing unit 122 constantly obtains ambience sound information 130 by the second microphone. A start time and sampling frequency in the password-generating command is decided by the WI-FI AP 120 for the purpose of synchronizing same. The second processing unit 122 generates a second password, and the mobile device 110 can be permitted to access the WI-FI AP 120 if the first password of the mobile device 110 matches with the second password of the WI-FI AP 120. The mobile device 110 is not permitted to access the WI-FI AP 120 if the first password of the mobile device 110 does not match with the second password of the WI-FI AP 120.

Figure 5:
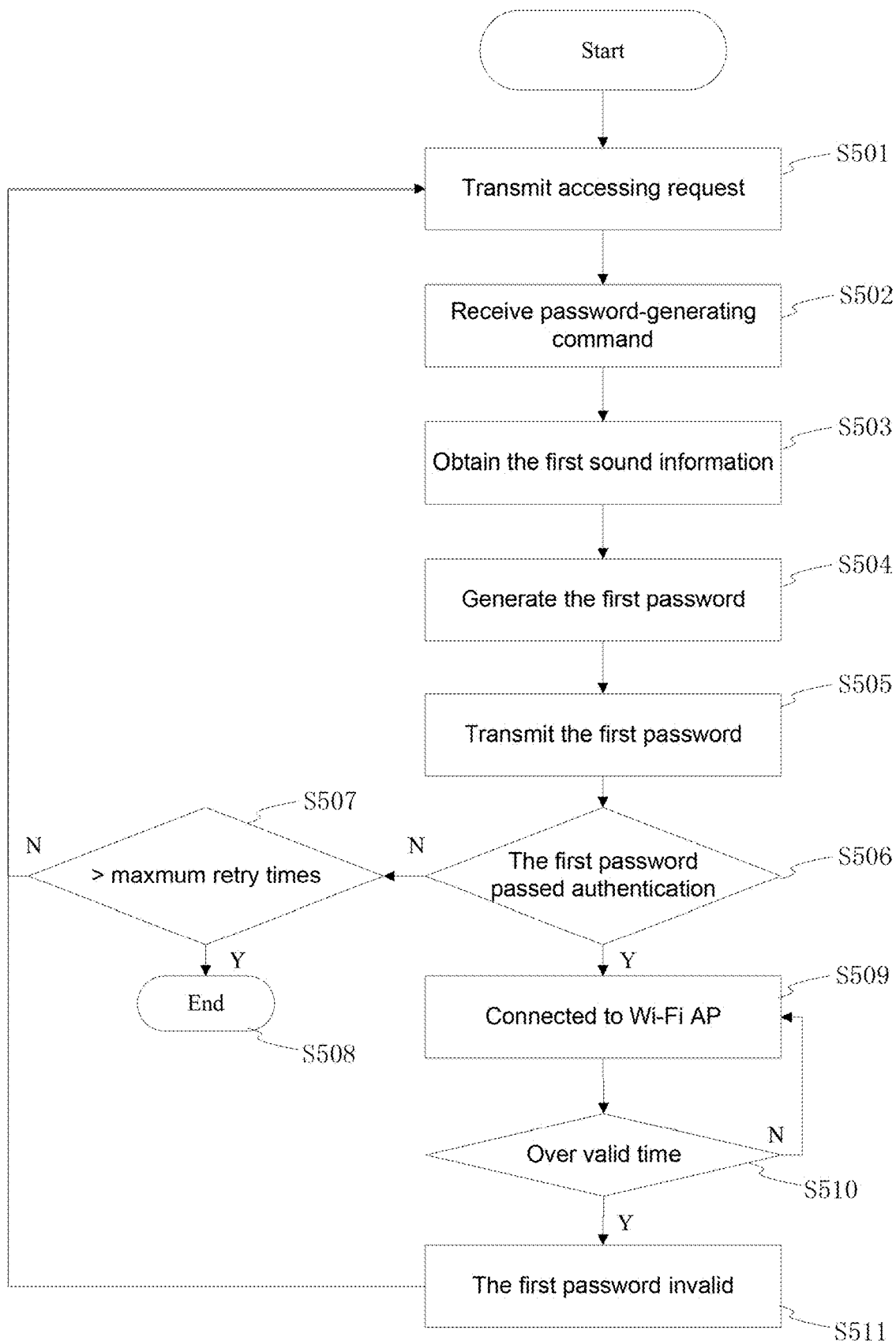
FIG. 5 illustrates a flow chart of a method for automatic access by a mobile device to a WI-FI network, according to an embodiment of the disclosure.

FIG. 5 illustrates a flow chart of a method for automatic access by a mobile device to a WI-FI network, according to an embodiment of the disclosure. As shown in FIG. 5, the method includes the steps of the mobile device searching for an accessible WI-FI access point and transmitting an accessing request to a WI-FI AP which may be discovered (step S501). The WI-FI AP transmits a password-generating command to the mobile device after receiving the accessing request. Therefore, after transmitting the accessing request the mobile device waits to receive the password-generating command which is transmitted from WI-FI AP (step S502). After receiving the password-generating command, the mobile device executes the password-generating command (step S503). The mobile device generates the first password according to the password-generating command (step S504). The mobile device transmits the generated first password to the WI-FI AP (step S505). The first password is authenticated by the WI-FI AP (step S506). The mobile device retransmits the accessing request and repeats request when the first password does not pass the authentication. The number of retrying repetitions will be checked against a maximum number. The maximum number of retry repetitions times is defined by the users (step S507). The processes for automatically accessing WI-FI network will be ended when the number of retries is more than the maximum number (step S308). The mobile device can make retries by retransmitting the accessing request to WI-FI AP (return to step S501) until the number of retries reaches the maximum number. The mobile device is permitted to access the WI-FI AP when the first password passes authentication. The mobile device is permitted to access the WI-FI AP for a certain permitted time (step S509). The WI-FI AP can check and apply further authentication processes during and after the certain permitted time (step S510). The first password will be invalid beyond the certain permitted time (step S511). The mobile device can retransmit the accessing request to WI-FI AP (return to step S501) if access by the mobile device to the WI-FI AP is cut off.

Figure 6:
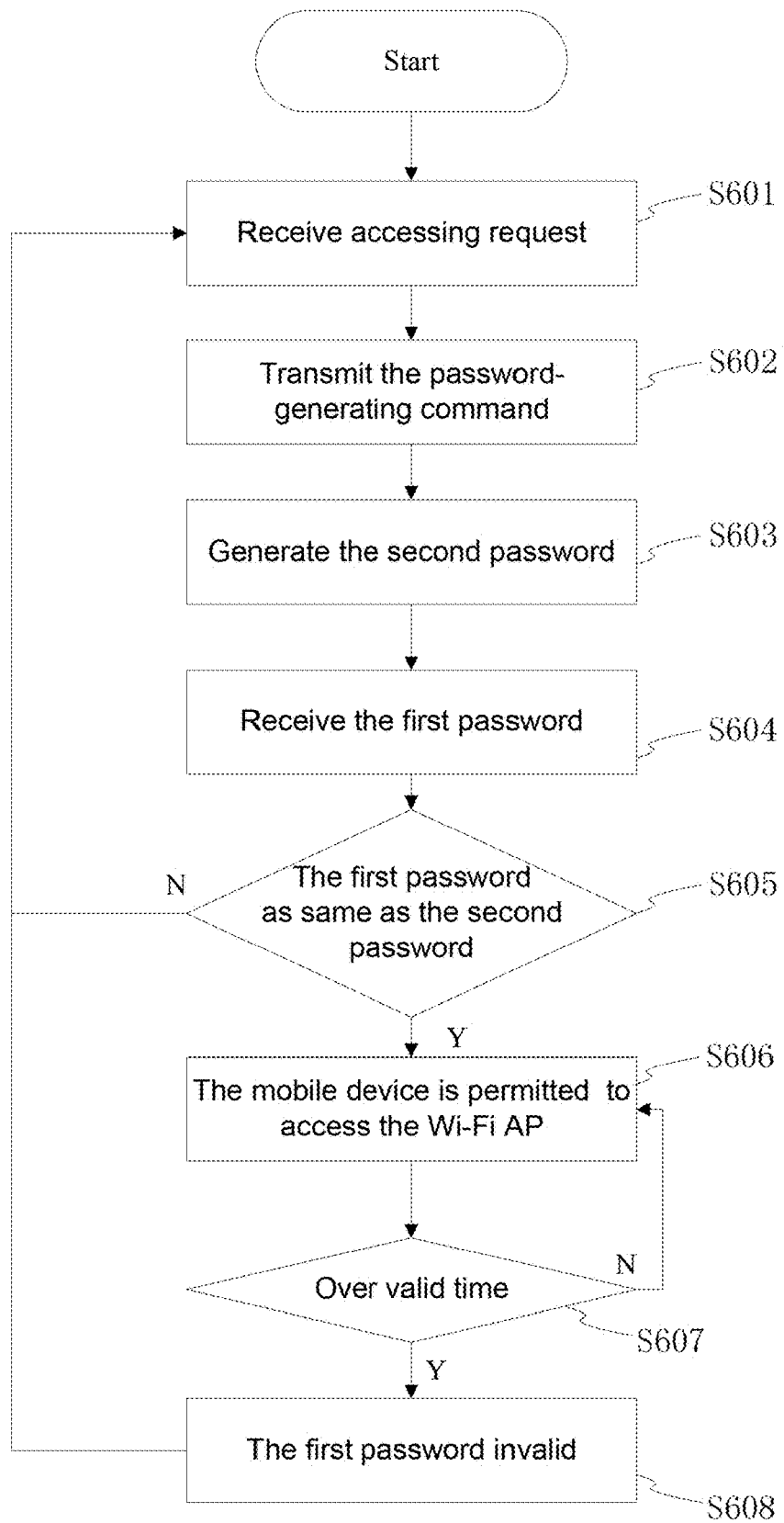
FIG. 6 illustrates a flow chart of a method for a WI-FI access point to automatically allow access according to an embodiment of the disclosure.

FIG. 6 illustrates a flow chart of a method for a WI-FI access point to automatically allow access according to an embodiment of the disclosure. As shown in FIG. 6, the WI-FI AP receives the accessing request from the mobile device (step S601). The WI-FI AP transmits the password-generating command to the mobile device for asking the mobile device generates the first password (step S602). The WI-FI AP generates the second password from the second sound information according to the password-generating command (step S603). The WI-FI AP receives the first password from the mobile device (step S604). The WI-FI AP checks the first password as same as the second password. The WI-FI AP waits for receiving the accessing request from the mobile device when the first password is not the same as the second password (return to step S601). The mobile device and the WI-FI AP obtain the same sound information in the same space. The first password is the same as the second password because of the same sound information (step S605). The mobile device is permitted to access the WI-FI AP when the first password is the same as the second password (step S606). The mobile device is permitted to access the WI-FI AP for a valid time. The WI-FI AP checks the authentication of the first password over valid time or not (step S607). The first password will be invalid over the valid time. The mobile device retransmits the accessing request to WI-FI AP (return to step S501) when the mobile device can not access to the WI-FI AP (step S608).

Figure 7:
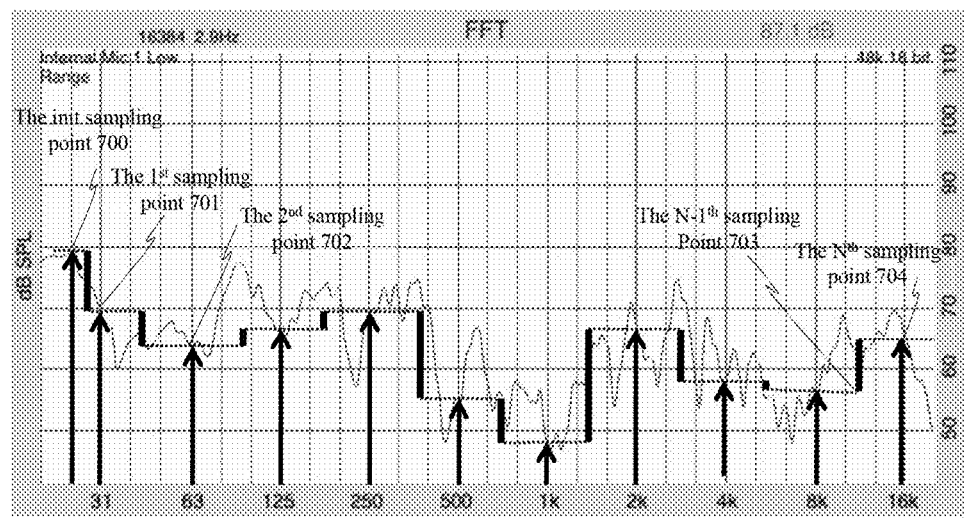
FIG. 7 illustrates a method for generating a password for automatic access to a WI-FI network according to an embodiment of the disclosure.

FIG. 7 illustrates a schematic diagram of the password generating of a method for automatically access to WI-FI network according to an embodiment of the disclosure. The ambience sound information is directly used as the basis for the password generation. In the embodiment, the ambience sound information is converted into audio characteristic. The password is generated according to the audio characteristic. The password-generating command includes the parameter of start time and the parameter of sampling frequency. The first sound information and the second sound information within a specified time are obtained according to the parameter of start time. The first sound information and the second sound information transfer to frequency signal of sound.

The first processing unit obtains values of first sound information on N sampling points according to the sampling time and the parameter of sampling frequency, a first $1^{st}$ string is obtained by value of $1^{st}$ sampling point of the first sound information subtract value of initial sampling point of the first sound information, a first $N^{th}$ string is obtained by value of $N^{th}$ sampling point of the first sound information subtract value of $N-1^{th}$ sampling point of the first sound information (N is a positive integer greater than 0). The first $N^{th}$ string is presented in the form of XYY. X is set 1 when value of $N^{th}$ sampling point of the first sound information subtract value of N-1$^{th}$ sampling point of the first sound information greater than 0 (set X=1 when (first $N^{th}$ string—first N-1$^{th}$ string)≥0). X is set 0 when value of first $N^{th}$ sampling point of the first sound information subtract value of first N-1$^{th}$ sampling point of the first sound information less than 0 (set X=0 when (first $N^{th}$ string–first N-1$^{th}$ string)<0). YY is set as a quotient when value of first $N^{th}$ sampling point of the first sound information subtract value of first N-1$^{th}$ sampling point of the first sound information divided by 3 (set YY=(first $N^{th}$ string–first N-1$^{th}$ string)/3). The first password is generated by making CRC transformation with a first string which strings by the first $1^{st}$ string to the first $N^{th}$ string.

The second processing unit obtains values of second sound information on N sampling points according to the sampling time and the parameter of sampling frequency, a second $1^{st}$ string is obtained by value of second $1^{st}$ sampling point of the second sound information subtract value of initial sampling point of the second sound information, a second $N^{th}$ string is obtained by value of second $N^{th}$ sampling point of the second sound information subtract value of second N-1$^{th}$ sampling point of the second sound information (N is a positive integer greater than 0). The second $N^{th}$ string is presented in the form of XYY. X is set 1 when value of second $N^{th}$ sampling point of the second sound information subtract value of second N-1$^{th}$ sampling point of the second sound information greater than 0 (set X=1 when (second $N^{th}$ string–second N-1$^{th}$ string≥0). X is set 0 when value of second $N^{th}$ sampling point of the second sound information subtract value of second N-1$^{th}$ sampling point of the second sound information less than 0 (set X=0 when (second $N^{th}$ string–second N-1$^{th}$ string)<0). YY is set as a quotient when value of second $N^{th}$ sampling point of the second sound information subtract value of second N-1$^{th}$ sampling point of the second sound information divided by 3 (set YY=(second $N^{th}$ string–second N-1$^{th}$ string)/3). The second password is generated by making CRC transformation with a second string which strings by the second $1^{st}$ string to the second $N^{th}$ string.

As shown in FIG. 7 as an example, an initial sampling point 700 value is 80 dB, a $1^{st}$ sampling point 701 value is 70 dB. The absolute value of the quotient is 3 when the $1^{st}$ sampling point 701 subtract the initial sampling point 700 divided by 3 (|(70 dB–80 dB)|/3=3). Thus the X of a $1^{st}$ string is set as 0, the YY of the $1^{st}$ string is set as 03, the $1^{st}$ string is 003. The absolute value of the quotient is 2 when a $2^{nd}$ sampling point 702 subtract the $1^{st}$ sampling point 701 divided by 3(|(64 dB–70 dB)|/3=2). Thus the X of a $2^{nd}$ string is set as 0, the YY of the $2^{nd}$ string is set as 02, the $1^{st}$ string is 003. The absolute value of the quotient is 2 when a $N^{th}$ sampling point 704 subtract a N-1$^{th}$ sampling point 703 divided by 3(|64 dB–57 dB)|/3=2). Thus the X of a $N^{th}$ string is set as 1, the YY of the $N^{th}$ string is set as 02, the $N^{th}$ string is 102. Such as the above rules, the $1^{st}$ string to the $N^{th}$ string in the frequency signal of sound in FIG. 7 is 003 002 101 101 005 002 105 003 001 102. A password is 95fdec29 which is obtained by CRC transfer the string which strings by the $1^{st}$ string to the $N^{th}$ string. (CRC(003 002 101 101 005 002 105 003 001 102)=95fdec29)

The system and method for automatically access the WI-FI network according to an embodiment of the disclosure enable the WI-FI AP to obtain environmental sound information by the WI-FI AP or the microphone on the same network. The mobile device is permitted to access to the WI-FI AP according to the characteristics of sound information. The authentication of the mobile device to access the WI-FI AP is invalid when the mobile device leaves the environment. The disclosure does not use the sound information of the environment directly in order to avoid the influence caused by the different sound source distances. The disclosure obtains the characteristics of the sound information of the environment according to analysis the difference of the sampling frequency data. The disclosure not only provides a method for automatically access to the WI-FI AP, but also reserves the wireless resource to the most needed users.

The embodiments shown and described above are only examples. Therefore, many such details of the art are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A system of automatically access to WI-FI network, comprising:
   a mobile device, comprising:
      a first microphone, obtaining a first sound information of an ambience of the mobile device;
      a first communicating unit, transmitting an accessing command, receiving a password-generating command and transmitting a first password;
      a first processing unit, obtaining the first sound information according to the first microphone, generating the first password from the first sound information according to the password-generating command, and
   a WI-FI access point, comprising:
      a second microphone, obtaining a second sound information of an ambience of the WI-FI access point;
      a second communicating unit, receiving the accessing request, transmitting the password-generating command and receiving the first password;
      a second processing unit, obtaining the accessing request and the first password according the second communicating unit, obtaining the second sound information according to the second microphone, generating the second password from the second sound information according to the password-generating command, comparing the first password and the second password, the mobile device be permitted to access the WI-FI access point when the first password matches with the second password.

2. The system of automatically access to WI-FI network of claim 1, wherein the password-generating command includes a parameter of start time and a parameter of sampling frequency, obtains sampling time of the first sound information and sampling time of the second sound information according to the parameter of start time.

3. The system of automatically access to WI-FI network of claim 2, wherein the first processing unit obtains values of first sound information on N sampling points according to the sampling time and the parameter of sampling frequency, a first $1^{st}$ string is obtained by value of $1^{st}$ sampling point of the first sound information subtract value of initial sampling point of the first sound information, a first $N^{th}$ string is obtained by value of $N^{th}$ sampling point of the first sound information subtract value of $N-1^{th}$ sampling point of the first sound information, N being a positive integer greater than 0, the first password is generated by making CRC transformation with a string which strings by the first $1^{st}$ string to the first $N^{th}$ string, the second processing unit obtains values of second sound information on N sampling points according to the sampling time and the parameter of sampling frequency, a second $1^{st}$ string is obtained by value of $1^{st}$ sampling point of the second sound information subtract value of initial sampling point of the second sound information, a second $N^{th}$ string is obtained by value of $N^{th}$ sampling point of the second sound information subtract value of $N-1^{th}$ sampling point of the second sound information, N being a positive integer greater than 0, the second password is generated by making CRC transformation with a string which strings by the second $1^{st}$ string to the second $N^{th}$ string.

4. The system of automatically access to WI-FI network of claim 1, wherein the mobile device is permitted to access the WI-FI access point in a period of time, the first password be invalid when the mobile device has accessed the WI-FI access point over the period of time, the mobile device transmit the accessing request to the WI-FI access point when the mobile device is disconnected by the WI-FI access point.

5. A method for automatically access to WI-FI network, comprising:

transmitting an accessing request to a WI-FI access point by a mobile device;

receiving the accessing request by WI-FI access point, transmitting password-generating command to the mobile device;

obtaining a first sound information of an ambience of the mobile device by a first microphone;

obtaining a second sound information of an ambience of the WI-FI access point by a second microphone;

generating a first password from the first sound information according to the password-generating command by the mobile device;

generating a second password from the second sound information according to the password-generating command by the WI-FI access point;

transmitting the first password to the WI-FI access point by the mobile device;

receiving the first password by the WI-FI access point;

comparing the first password and the second password, the mobile device be permitted to access the WI-FI access point when the first password matches with the second password.

6. The method for automatically access to WI-FI network of claim 5, wherein the password-generating command includes a parameter of start time and a parameter of sampling frequency, obtains sampling time of the first sound information and sampling time of the second sound information according to the parameter of start time.

7. The method for automatically access to WI-FI network of claim 6, wherein the first processing unit obtains values of first sound information on N sampling points according to the sampling time and the parameter of sampling frequency, a first $1^{st}$ string is obtained by value of $1^{st}$ sampling point of the first sound information subtract value of initial sampling point of the first sound information, a first $N^{th}$ string is obtained by value of $N^{th}$ sampling point of the first sound information subtract value of $N-1^{th}$ sampling point of the first sound information, N being a positive integer greater than 0, the first password is generated by making CRC transformation with a string which strings by the first $1^{st}$ string to the first $N^{th}$ string, the second processing unit obtains values of second sound information on N sampling points according to the sampling time and the parameter of sampling frequency, a second $1^{st}$ string is obtained by value of $1^{st}$ sampling point of the second sound information subtract value of initial sampling point of the second sound information, a second $N^{th}$ string is obtained by value of $N^{th}$ sampling point of the second sound information subtract value of $N-1^{th}$ sampling point of the second sound information, N being a positive integer greater than 0, the second password is generated by making CRC transformation with a string which strings by the second $1^{st}$ string to the second $N^{th}$ string.

8. The method for automatically access to WI-FI network of claim 5, wherein the mobile device is permitted to access the WI-FI access point in a period of time, the first password be invalid when the mobile device has accessed the WI-FI access point over the period of time, the mobile device transmit the accessing request to the WI-FI access point when the mobile device is disconnected by the WI-FI access point.

* * * * *